US005500176A

United States Patent [19]

Parks et al.

[11] Patent Number: 5,500,176
[45] Date of Patent: Mar. 19, 1996

[54] PROCESS FOR THE PRODUCTION OF MOLDED PRODUCTS USING INTERNAL MOLD RELEASE AGENTS

[75] Inventors: Kristen L. Parks, Wexford; Richard W. Mitesser, Pittsburgh; Merle W. Lesko, McDonald, all of Pa.

[73] Assignee: Bayer Corporation, Pittsburgh, Pa.

[21] Appl. No.: 275,687

[22] Filed: Jul. 14, 1994

Related U.S. Application Data

[63] Continuation-in-part of Ser. No. 123,489, Sep. 17, 1993, abandoned.

[51] Int. Cl.$^6$ .............................. B29C 45/00; B29C 70/12
[52] U.S. Cl. ..................... 264/257; 264/300; 264/328.6; 264/328.18
[58] Field of Search ................................ 264/257, 300, 264/328.6, 328.18

[56] References Cited

U.S. PATENT DOCUMENTS

| | | | |
|---|---|---|---|
| 3,726,952 | 4/1973 | Boden et al. | 264/48 |
| 3,875,069 | 4/1975 | Worschech et al. | 252/56 S |
| 4,058,492 | 11/1977 | von Bonin et al. | 521/110 |
| 4,098,731 | 7/1978 | von Bonin et al. | 521/51 |
| 4,111,861 | 9/1978 | Godlewski | 521/123 |
| 4,130,698 | 12/1978 | Sparrow et al. | 521/130 |
| 4,201,847 | 5/1980 | Kleimann et al. | 521/172 |
| 4,254,228 | 3/1981 | Kleimann et al. | 521/128 |
| 4,499,254 | 2/1985 | Dominguez et al. | 528/49 |
| 4,519,965 | 5/1985 | Taylor et al. | 264/51 |
| 4,581,386 | 4/1986 | Taylor et al. | 521/125 |
| 4,585,803 | 4/1986 | Nelson et al. | 521/105 |
| 4,764,537 | 8/1988 | Horn et al. | 521/51 |
| 4,868,224 | 9/1989 | Harasin et al. | 521/124 |
| 5,019,317 | 5/1991 | Slocum et al. | 264/300 |
| 5,182,034 | 1/1993 | Meyer et al. | 252/32.5 |
| 5,389,696 | 2/1995 | Dempsey et al. | 521/128 |

FOREIGN PATENT DOCUMENTS

| | | |
|---|---|---|
| 1365215 | 8/1974 | United Kingdom . |
| 2101140 | 1/1983 | United Kingdom . |

*Primary Examiner*—Leo B. Tentoni
*Attorney, Agent, or Firm*—Joseph C. Gil; N. Denise Brown

[57] ABSTRACT

The present invention is directed to an improved internal mold release system for the production of high density molded SRIM parts, i.e. molded parts having a density of from 1.3 to 2.0 g/cc. In particular, the process includes reacting a reaction mixture including an organic polyisocyanate and at least one organic compound containing isocyanate-reactive hydrogens in the presence of a catalyst and an internal mold release agent in a closed mold. The internal mold release agent includes:

a) mixed esters including the reaction product of i) aliphatic dicarboxylic acids, ii) aliphatic polyols, and iii) monocarboxylic acids with 12 to 30 carbon atoms in the molecule.

The reaction mixture may additionally include a fatty acid such as, for example, oleic acid.

10 Claims, No Drawings

PROCESS FOR THE PRODUCTION OF MOLDED PRODUCTS USING INTERNAL MOLD RELEASE AGENTS

This application is a continuation-in-part of application Ser. No. 08/123,489 filed on Sep. 17, 1993, now abandoned.

BACKGROUND OF THE INVENTION

Internal mold release agents used in the production of molded polyurethane and polyurea products are known. U.S. Pat. Nos. 4,201,847 and 4,254,228 describe an internal mold release which is the reaction product of an organic polyisocyanate and an active hydrogen containing fatty acid ester. U.S. Pat. No. 4,111,861 describes four different classes of internal mold releases; i) mixtures of aliphatic or aryl carboxylic acid and a polar metal compound; ii) carboxyalkylsiloxanes; iii) aliphatic glyoximes; and iv) aralkyl ammonium salts. Other known release agents include salts of acids (such as oleic acid) and primary amines (see, U.S. Pat. No. 3,726,952), reaction products of long chain fatty acids and ricinoleic acid (see, U.S. Pat. No. 4,058,492), and salts of acids (such as oleic acid) and tertiary amines (see, U.S. Pat. No. 4,098,731).

Zinc carboxylates containing from 8 to 24 carbon atoms per carboxylate group have also been described (U.S. Pat. Nos. 4,519,965, 4,581,386, 4,585,803 and 4,764,537, and British Patent 2,101,140). Release agents containing zinc carboxylates in combination with primary or secondary amine compatibilizers and an organic material containing a carboxylic acid group, a phosphorous containing acid group or a boron containing acid group, are described and published European Patent Application 0,119,471.

Recently, a system which provides release from a bare metal mold has been developed. The system utilizes the reaction product of an organic polyisocyanate and an active hydrogen containing fatty acid ester in the A-side and a zinc carboxylate in the B-side (see, U.S. Pat. No. 4,868,224). One problem with this system is that the zinc carboxylate/solubilizer combination catalyzes the hydroxyl/isocyanate reaction. This makes the system relatively fast, leading to difficulties in filling large molds. It is known to add fatty acids to polyurea systems in order to increase the green strength and aid in mold release (see, U.S. Pat. No. 4,499,254). Another known system which releases from bare metal molds is disclosed in U.S. Pat. No. 5,019,317. It uses a similar isocyanate/fatty acid ester reaction product and zinc carboxylate combination as described hereinabove to produce a molded product.

U.S. Pat. No. 3,875,069 discloses lubricant compositions which are said to be useful in the shaping of thermoplastic materials. These lubricant materials comprise (A) mixed esters with hydroxyl and acid numbers of 0 to 6 of (a) alkane polyols, (b) a dicarboxylic acid, and (c) aliphatic hydrocarbon monocarboxylic acids, said mixed esters having a molecular weight of at least 524; and (B) esters selected from the group consisting of (1) esters of the dicarboxylic acids of (A)(b) and aliphatic monofunctional alcohols, (2) esters of aliphatic monofunctional alcohols and aliphatic hydrocarbon monocarboxylic acids, and (3) complete esters or partial esters of alkanepolyols and aliphatic hydrocarbon monocarboxylic acids, with the ratio by weight of (A) to (B) being from 1:3 to 9:1.

The present invention is directed to a new internal mold release agent which provides excellent release from metal molds.

DESCRIPTION OF THE INVENTION

The present invention is directed to an improved internal mold release system for the production of high density SRIM molded parts, i.e. molded parts having a density of from 1.3 to 2.0 g/cc. In particular, the process comprises reacting a reaction mixture comprising an organic polyisocyanate and at least one organic compound containing isocyanate-reactive hydrogens in the presence of a catalyst and an internal mold release agent in a closed mold. The internal mold release agent comprises:

a) from at least 0.2 to 7.5% by weight, based on the weight of the reaction mixture, of mixed esters comprising the reaction product of aliphatic dicarboxylic acids, aliphatic polyols, and monocarboxylic acids with 12 to 30 carbon atoms in the molecule, wherein said reaction product has an acid number of less than 25 and a hydroxyl number of less than 25, and preferably both are less than 15.

It is preferred that component a) comprise the reaction product of i) adipic acid, ii) pentaerythritol, and iii) oleic acid, wherein said reaction product has an acid number of less than 25 and a hydroxyl number of less than 25, and preferably both are less than 15.

Preferably, the internal mold release agent contains from 0.2 to 3.5% by weight, based on the weight of the reaction mixture, of component a).

The internal mold release agents of the present invention are used in the absence of esters selected from the group consisting of: (1) esters of (i) dicarboxylic acids and (ii) aliphatic monofunctional alcohols of 12 to 30 carbon atoms, (2) esters of (i) aliphatic monofunctional alcohols having 12 to 30 carbon atoms and (ii) aliphatic hydrocarbon monocarboxylic acids with 12 to 30 carbon atoms, and (3) complete esters or partial esters of (i) aliphatic polyols and (ii) aliphatic hydrocarbon monocarboxylic acids having 12 to 30 carbon atoms. These esters which are to be excluded from the internal mold release agent of the present invention are further described as component (B) in U.S. Pat. No. 3,875,069 at column 3, lines 36–46 and at column 7, line 1 through column 8, line 59.

In a preferred embodiment of the present invention, the reaction mixture additionally comprises from 0 to 10% by weight, based on the weight of the reaction mixture, of a fatty acid. Preferably the reaction mixture contains from 2 to 7% by weight, based on the weight of the reaction mixture, of a fatty acid. Oleic acid is the preferred fatty acid.

In addition, the reaction mixture may comprise up to 70% by weight, based on the weight of the reaction mixture, of reinforcing agents, including mats and fillers. Both organic and inorganic reinforcing agents and fillers may be used. It is preferred that the reaction mixture comprise from 45 to 65% by weight, based on the weight of the reaction mixture, of reinforcing agents and/or fillers.

It has been found that the internal mold release agent described hereinabove gives excellent release from a variety of different mold surfaces, such as steel or aluminum. As is typical in the industry, an application of paste wax is applied to the surface of the mold. Conventional paste waxes are commercially available from Chem-Trend, Inc. One such example is RCT-C-2080. The paste wax fills the pores of the tool and forms a barrier coat to keep the urethane from sticking to the tool. It is necessary to apply one spray of external mold release to the surface of the mold prior to molding the first part. This external mold release may be either a water or a wax based release agent. Typically, this will enable the easy release of at least 20 parts from the mold.

Suitable compounds to be used as component a) are the mixed esters comprising the reaction product of i) aliphatic dicarboxylic acids, ii) aliphatic polyols, and iii) monocarboxylic acids with 12 to 30 carbon atoms in the molecule, wherein said reaction product has an acid number of less than 25 and a hydroxyl number of less than 25 (and preferably both are less than 15), are compounds such as those described, for example, in U.S. Pat. No. 3,875,069, the entirety of which is herein incorporated by reference. More specifically, U.S. Pat. No. 3,875,069 describes a component (A) of mixed esters which are suitable to be used in the present invention as component a). Although these mixed esters are described in U.S. Pat. No. 3,875,069 as having acid and hydroxyl numbers of 0 to 6, this can easily be altered by one of ordinary skill in the art, for example, by modifying the quantities of the individual components relative to each other. This same U.S. Patent also describes a process of making these compounds which are suitable for use as component a) in the present invention.

It is preferred that the compound used as component a) in the present invention comprise the reaction product of i) adipic acid, ii) pentaerythritol, and iii) oleic acid, wherein said reaction product has an acid number of less than 25 and a hydroxyl number of less than 25, and preferably both are less than 15. A particularly preferred compound to be used as component a) in the present invention is Loxiol G-71S, commercially available from Henkel. U.S. Pat. No. 3,875, 069 describes this compound and a process for making it.

Suitable fatty acids to be used in the reaction mixture in addition to the internal mold release agent described hereinabove, include, for example, fatty acids such as those described in U.S. Pat. No. 4,499,254, incorporated herein by reference. Typical are those acids presented by the formula: $R(CO_2H)_n$, wherein n is 1, 2, or 3 and where R contains at least 10 carbon atoms. R may be alkyl (i.e. cyclic, linear, or branched), alkaryl, aralkyl, or aryl, saturated or unsaturated. Examples of useful acids include, for example, n-decanoic acid, neodecanoic acid, lauric acid, palmitic acid, stearic acid, isostearic acid, oleic acid, linoleic acid, and the like. The fatty acid can be used in the B-side of the reaction mixture. It is simply mixed with the particular component prior to use. The relative amounts of fatty acid used are as described hereinabove. Oleic acid is the preferred fatty acid.

Starting polyisocyanate components for use in the present invention include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of these compounds are ethylene diisocyanate, 1,4-tetramethylene diisocyanate, 1,6-hexamethylene diisocyanate; 1,12-dodecane diisocyanate, cyclobutane-1,3-diisocyanate; cyclohexane-1,3- and -1,4-diisocyanate and mixtures of these isomers. Additional examples are 1-isocyanato-3,3,5-trimethyl-5-isocyanato-methyl cyclohexane (German Auslegeschrift No. 1,202,785, U.S. Pat. No. 3,401, 190), 2,4- and 2,6-hexahydro-tolylene diisocyanate and mixtures of these isomers. Hexahydro-1,3- and/or-1,4-phenylene diisocyanate; perhydro-2,4'- and.or -4,4'-diphenylmethane diisocyanate; 1,3- and 1,4-phenylene diisocyanate; 1,4- and 2,5-tolylene diisocyanate and mixtures of these isomers are also suitable in the instant invention. Diphenylmethane-2,4- and/or -4,4'-diisocyanate; naphthylene-1, 5-diisocyanate; triphenyl methane-4,4'-4"-triisocyanate; polyphenyl polymethylene polyisocyanates of the type obtained by condensing aniline with formaldehyde, followed by phosgenation and described, for example, in British Patent Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Patent No. 1,902, 007 (U.S. Pat. No. 3,152,162); diisocyanates of the type described in U.S. Pat. No. 3,492,330; and polyisocyanates containing allophanate groups of the type described, for example, in British Patent No. 993,890, in Belgian Patent No. 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Offenlegungsschriften Nos. 1,929, 034 and 2,004,408; polyisocyanates containing urethane groups of the type described, for example, in Belgian Patent No. 752,261 or in U.S. Pat. No. 3,394,164; polyisocyanates containing acylated urea groups according to German Patent No. 1,230,778 and polyisocyanates containing biuret groups of the type described, for example, in German Patent No. 1,101,394 (U.S. Pat. Nos. 3,124,605 and 3,201,372) and in British Patent No. 889,050 are also suitable.

Polyisocyanates produced by telomerization reactions of the type described, for example, in U.S. Pat. No. 3,654,106; polyisocyanates containing ester groups of the type described for example, in British Patent Nos. 965,474 and 1,072,956, in U.S. Pat. No. 3,567,763 and in German Patent No. 1,231,688; reaction products of the above-mentioned isocyanates with acetals according to German Patent No. 1,072,385 and polyisocyanates containing polymeric fatty acid residues, according to U.S. Pat. No. 3,455,883 are still further examples of suitable isocyanates.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Patent No. 1,618,380 (U.S. Pat. No. 3,644,457). These may be produced for example, by reacting 1 mol of 4,4'-diisocyanato-diphenylmethane with from 0.05 to 0.3 mols of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Patent No. 1,092,007 (U.S. Pat. No. 3,152,162). Mixtures of these preferred polyisocyanates can also be used. In general, aliphatic cycloaliphatic isocyanates are less suitable for the purpose of the instant invention.

Also preferred are the polyphenyl-polymethylene polyisocyanates obtained by the phosgenation of an aniline/formaldehyde condensate. Where reinforcing fiber mats are used, it is particularly preferred that such polyisocyanates have viscosities of 200 mPa.s or less at 25° C.

Also necessary for preparing the molded product of the present invention is an isocyanate reactive component. Generally, isocyanate reactive compounds include, for example, organic compounds containing hydroxyl groups or amine groups. It is generally preferred to include hydroxyl group containing compounds. These materials may be typically divided into two groups, high molecular weight compounds having a molecular weight of 500 to 10,000 and low molecular weight compounds having a molecular weight of 62 to 499. These low molecular weight compounds are commonly referred to as chain extenders. Examples of suitable high molecular weight compounds include the polyesters, polyethers, polythioethers, polyacetals and polycarbonates containing at least 2, preferably 2 to 8 and most preferably 2 to 4 hydroxyl groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the present of $BF_3$ or chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. Polyethers modified by vinyl polymers, of the type formed, for example, by polymerizing styrene or acrylonitrile in the presence of polyether (U.S. Pat. No. 3,383,351); 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. Patents. Finally, representatives of the many and varied compounds which may be used in accordance with the invention may be found for example in High Polymers, Volume XVI, "Polyurethanes, Chemistry and Technology", by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl-Hanser-Verlag, Munich, 1966, pages 45–71.

In accordance with the present invention, the high molecular weight compounds can be used in a mixture with low molecular weight polyols. Examples of suitable hydroxyl group-containing polyols include ethylene glycol, 1,2- and 1,3-propylene diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amine group and at least one, preferably two linear or branched alkyl substituents containing from 1 to 4, preferably 1 to 3, carbon atoms in the ortho-position to a second amine group. These aromatic diamines include 1-methyl-3,5-diethyl-1,2,4-diamino benzene, 1-methyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl- 5,5'-diisopropyl-4,4'-diamino diphenylmethane, 1-methyl-2,6-diamino-3-isopropylbenzene and mixtures of the above diamines. Most preferred are mixtures of 1-methyl-3,5-diethyl-2,4-diamino benzene and 1-methyl- 3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diamino-diphenyl-methane, 1,2- and 1,4-phenylene diamine, naphthalene-1,5odiamine and triphenylmethane-4,4'-4"-triamine. The trifunctional and polyfunctional aromatic amine compounds may also exclusively or partly contain secondary amine groups such as 4,4'-di-(methylamino)-diphenylmethane or 1-methyl-2-methylamino-4-amino-benzene. Liquid mixtures of polyphenyl polymethylene-polyamines, of the type obtained by condensing aniline with formaldehyde, are also suitable. Generally, the non-sterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

The reaction mixture used in the present invention should also include catalysts.

Suitable catalysts which may be used in the present invention include catalysts such as, for example, various organic metal compounds, including, for example, tin(11) salts of carboxylic acids, dialkyl tin salts of carboxylic acids, dialkyl tin mercaptides, dialkyl tin dithioesters and tertiary amines, such as, for example, dimethylcyclohexylamine (i.e. Polycat 8), pentamethyldiethylenetriamine (i.e. Polycat 5), bis[2-(dimethylamino)ethyl] ether (Niax A-1), dimethylethanolamine (DMEA), Dabco WT, etc.. Of course, it is also possible to use any of the catalysts which are well known to those skilled in the art of polyurethane chemistry. It is preferred to use tertiary amines as the catalysts in the present invention.

The process of the present invention is a typical SRIM, i.e. structural reaction injection molding, process. The SRIM process is the same as a conventional RIM process, except that it requires a reinforcing mat to be placed in the mold cavity prior to the introduction of the reaction mixture.

Reinforcing mats which are also useful in this invention comprise, for example, glass mats, graphite mats, polyester mats, polyaramide mats such as, for example, KEVLAR mats, and mats made from any fibrous material. Also, this includes, for example, random continuous strand mats made of glass fiber bundles, woven mats and oriented mats such as, for example, uniaxial or triaxial mats.

In addition to the hereinabove described reinforcing mats, it is also to possible to use additional fillers and reinforcing agents in the present invention. These may be included in the reaction mixture by mixing with one or both components, i.e. the isocyanate component and/or the isocyanate-reactive component, prior to mixing the components via the RIM process.

Suitable fillers and reinforcing agents which may be included in the reaction mixture as described hereinabove include both organic and inorganic compounds. These inorganic compounds include, for example, compounds such as glass in the form of fibers, flakes, cut fibers, or microspheres; mica, wollastonite; carbon fibers; carbon black; talc; and calcium carbonate. Suitable organic compounds include, for example, expanded microspheres which are known and described in, for example, U.S. Pat. Nos. 4,829,094, 4,843,104, 4,902,722, and 4,959,395, the disclosures of which are herein incorporated by reference, and U.S. Pat. No. 5,244,613 the disclosure of which is herein incorporated by reference. These include commercially available microspheres such as, for example, Dualite M6017AE, Dualite M6001AE, and Dualite M6029AE, all of which are available from Pierce & Stevens Corporation, and Expandocel which is available from Nobel Industries.

In addition to the catalysts and fillers and reinforcing agents, other additives which may also be used in the reaction mixture to form the molding compositions of the present invention include, for example, the known cell regulators, flame retarding agents, plasticizers, dyes, blowing agents, surface-active agents, etc.

Suitable surface-active additives include compounds such as, for example, emulsifiers and foam stabilizers. Some suitable surface-active additives include compounds such as, for example, N-stearyl-N',N'- bis-hydroxyethyl urea, oleyl polyoxyethylene amide, stearyl diethanoi amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salt of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565.

The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the polyisocyanate component, while the second stream contains the isocyanate reactive components and any other additives which are to be included.

The invention is further illustrated but is not intended to be limited by the following examples in which all pads and percentages are by weight unless otherwise specified.

EXAMPLES

General Procedure

The polyurethane system use represents a typical RIM 2-component system. The A-side is a typical polymeric diphenylmethane diisocyanate and is described hereinbelow. The B-side is a mixture of polyols and/or other organic compounds containing isocyanate-reactive hydrogens, catalysts and IMR agents. These are also described hereinbelow. The IMR agent was added to the B-side of the system.

All of these examples relate to a SRIM (i.e. structural reaction injection molding) process, wherein the specified number (or quantity) of reinforcing mats was preplaced in the tool.

The temperature of both the A and B components in all of the working examples is maintained at about 90° F.

Prior to beginning the trials, the surface of the mold used in each example was cleaned with Chem-Trend 201B mold cleaner (i.e. n-methyl pyrrolidone). The mold used in each example was buffed with Chem-Trend 2080 paste wax and lightly sprayed with Chem-Trend 2006. The mold temperature in each example was maintained at approximately 175° F. No additional paste wax or external mold release was used after the molding of the first part in each example.

A successful release requires no sticking or tearing of the molded part, and the part was removed from the mold without applying significant force.

In Examples 1–3, the following isocyanates and polyols were used:

Isocyanate: A commercially available polymethylene poly(phenyl isocyanate) having a isocyanate group content of about 32% by weight, and having a diisocyanate content of about 48% by weight. The diisocyanate comprises about 5% by weight of 2,4'-methylene bis(phenyl isocyanate) and about 43% by weight of 4,4'-methylene bis(phenylisocyanate).

Polyol A: an adduct of propylene glycol and propylene oxide, having a molecular weight of about 425.

Polyol B: an adduct of glycerin with a mixture of ethylene oxide and propylene oxide in about an 82:18% by weight to obtain a molecular weight of about 6010.

Polyol C: an adduct of ethylene diamine with propylene oxide, having a molecular weight of about 350.

| Polyol Blend | |
|---|---|
| | PBW |
| Polyol A | 29 |
| Polyol B | 25 |
| Polyol C | 24 |
| Ethylene Glycol | 22 |
| Oleic Acid | 5 |
| PC-15 | 0.35 |
| SA-610/50 | 1.5 |

PC-15 (Polycat 15): a tertiary amine with a reactive secondary amine catalyst; commercially available from Air Products.

SA-610/50: an acid-blocked 1,5-diazodicyclo (5.4.0) undec-5-ene delayed action catalyst; commercially available from Air Products.

IMR: Loxiol-G-71S, commercially available from Henkel; the reaction product of adipic acid, pentaerythritol, and oleic acid, having an acid number of less than 15 and an hydroxyl number of less than 15.

The mix ratio of A:B in all of the working examples was about 151/100, wherein A represents the isocyanate and B represents the polyol component. All of the examples were ran at an isocyanate index of about 105.

Example 1

The mold was cleaned and buffed as described previously. A total of 4 oz/sq. ft. of OCF M-8610 continuous strand mat reinforcement, commercially available from Owens Corning Fiberglass, was placed inside the mold prior to closing the mold. The A-side and the B-side containing 5 parts by weight of Loxiol per 100 parts of the polyol blend, were then injected into the mold.

| Processing Parameters | |
| --- | --- |
| Throughput | 252 g/s |
| Mix Pressures (A/B) | 2,000 psi/2,100 psi |
| Mold | 15" by 15" polished plaque |
| Demold Time | 60 s |
| Gel Time | 16 s |

Forty panels, each containing 4 oz./sq. ft. of OCF M-8610 continuous strand mat reinforcement, were easily released from the mold with no further application of external mold releases.

Example 2

J-car bumper beam parts were molded in this example. The same polyol blend, internal mold release agent, and isocyanate were used as in Example 1. However, only 0.5 parts by weight, per 100 parts of polyol blend, of Loxiol were used. Each part in example 2 was molded with a Fabmat 2415 reinforcing mat, a woven roving combination mat which is commercially available from Fiberglass Industries. About 4 layers of mat was used in each part.

| Processing Parameters | |
| --- | --- |
| Throughput | 454 g/s |
| Mix Pressures (A/B) | 2,000 psi/2,200 psi |
| Mold | J-Car Bumper Beam |
| Demold Time | 45 s |
| Gel Time | 19 s |

Twenty beams released easily from the tool before the study was concluded. There was no evidence of urethane build-up on the tool. In addition, the flash released quite easily after the pads were produced. The release of molded pads using this IMR was greatly improved over the control IMR (i.e. zinc stearate).

Example 3

A trial on an Oldsmobile package shelf tool was run in this example. Loxiol G-71-S was used in the same quantity as in Example 2; i.e. 0.5 parts by weight, per 100 parts of polyol blend. The same processing parameters were used here as in Example 2. This example used a directed chopped fiber preform containing about 45% by weight of glass.

This system provided improved release and flow in comparison to a zinc stearate IMR. The better fill of the pad is apparently due to the long gel time, i.e. 19 seconds, of the system.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for producing a SRIM molded part having a density of from 1.3 to 2.0 g/cc, by reacting a reaction mixture comprising an organic polyisocyanate and at least one organic compound containing isocyanate-reactive hydrogens in the presence of a catalyst and an internal mold release agent in a closed mold to form a SRIM molded part, the improvement wherein said internal mold release agent comprises:

a) from at least 0.2 to 7.5% by weight, based on the weight of said reaction mixture, of mixed esters comprising the reaction product of i) aliphatic dicarboxylic acids, ii) aliphatic polyols, and iii) monocarboxylic acids with 12 to 30 carbon atoms in the molecule;

wherein said reaction product has an acid number of less than 25 and a hydroxyl number of less than 25, with the proviso that said internal mold release agent excludes esters selected from the group consisting of: (1) esters of (i) dicarboxylic acids and (ii) aliphatic monofunctional alcohols of 12 to 30 carbon atoms, (2) esters of (i) aliphatic monofunctional alcohols having 12 to 30 carbon atoms, and (ii) aliphatic hydrocarbon monocarboxylic acids with 12 to 30 carbon atoms, and (3) complete esters or partial esters of (i) aliphatic polyols and (ii) aliphatic hydrocarbon monocarboxylic acids having 12 to 30 carbon atoms.

2. The process of claim 1, wherein said internal mold release agent comprises from 0.2 to 3.5% by weight, based on the weight of said reaction mixture, of said component a).

3. The process of claim 1 wherein said reaction product has an acid number of less than 15 and a hydroxyl number of less than 15.

4. The process of claim 2, wherein said reaction product has an acid number of less than 15 and a hydroxyl number of less than 15.

5. The process of claim 1 wherein said component a) comprises the reaction product of adipic acid, pentaerythritol, and oleic acid.

6. The process of claim 5, wherein said component a) has an acid number of less than 15 and a hydroxyl number of less than 15.

7. The process of claim 1, wherein said reaction mixture additionally comprises from 0 to 10% by weight, based on the weight of said reaction mixture, of oleic acid.

8. The process of claim 1, wherein said reaction mixture additionally comprises from about 2.0 to 7.0% by weight, based on the weight of said reaction mixture, of oleic acid.

9. The process of claim 1, wherein said reaction mixture additionally comprises up to 70% by weight, based on the weight of said reaction mixture, of a filler or reinforcing agent.

10. The process of claim 1, wherein said reaction mixture additionally comprises from 45 to 65% by weight, based on the weight of said reaction mixture, of a filler or reinforcing agent.

* * * * *